US012711384B2

(12) United States Patent
Harvey et al.

(10) Patent No.: US 12,711,384 B2
(45) Date of Patent: Aug. 18, 2026

(54) NEURAL NETWORK INITIALIZATION

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 1108 days.

(21) Appl. No.: 17/308,294

(22) Filed: May 5, 2021

(65) Prior Publication Data

US 2021/0383219 A1 Dec. 9, 2021

Related U.S. Application Data

(60) Provisional application No. 62/704,976, filed on Jun. 5, 2020.

(51) Int. Cl.

*G06N 3/084* (2023.01)
*B60H 1/00* (2006.01)

(Continued)

(52) U.S. Cl.

CPC ......... *G06N 3/084* (2013.01); *B60H 1/00285* (2013.01); *F24F 11/64* (2018.01); *F24F 11/65* (2018.01); *G05B 13/027* (2013.01); *G05B 13/04* (2013.01); *G05B 19/042* (2013.01); *G06F 17/16* (2013.01); *G06F 30/18* (2020.01); *G06F 30/27* (2020.01); *G06N 3/04* (2013.01); *G06N 3/047* (2023.01); *G06N 3/048* (2023.01); *G06N 3/063* (2013.01); *G06N 3/08* (2013.01); *G06Q 10/067* (2013.01); *G06Q 50/163* (2013.01); *F24F 2120/10* (2018.01); *F24F 2120/20* (2018.01); *F24F 2140/50* (2018.01); *G05B 2219/2614* (2013.01); *G06F 2119/06* (2020.01); *G06F 2119/08* (2020.01)

(58) Field of Classification Search

CPC .......... G06N 3/048; G06N 3/063; G06N 3/08; G06N 3/00; G06N 5/00; G06N 7/00; G06N 20/00; G06N 99/00; G05B 13/00; G05B 17/00; G05B 19/00

See application file for complete search history.

(56) References Cited

U.S. PATENT DOCUMENTS 5,224,648 A 7/1993 Simon et al.
5,361,326 A * 11/1994 Aparicio, IV ......... G06N 3/105 706/44

(Continued)

OTHER PUBLICATIONS

L.V. Kamble et al., "Heat Transfer Studies using Artificial Neural Network—a Review", International Energy Journal, pp. 25-42 (Year: 2014).*

(Continued)

*Primary Examiner* — Kakali Chaki
*Assistant Examiner* — Johnathan R Germick

(57) ABSTRACT

A neural network representing a controlled space can be initialized by collecting state time series data that affects the controlled space such as weather, and also collecting sensor data from the controlled space at the same time. The time series data is used as input to a neural network that models the controlled space until an area in the neural network equivalent to the sensor is at or near the sensor state at a given time.

21 Claims, 7 Drawing Sheets

(51) Int. Cl.

| | |
|---|---|
| ***F24F 11/64*** | (2018.01) |
| ***F24F 11/65*** | (2018.01) |
| ***G05B 13/02*** | (2006.01) |
| ***G05B 13/04*** | (2006.01) |
| ***G05B 19/042*** | (2006.01) |
| ***G06F 17/16*** | (2006.01) |
| ***G06F 30/18*** | (2020.01) |
| ***G06F 30/27*** | (2020.01) |
| ***G06N 3/04*** | (2023.01) |
| ***G06N 3/047*** | (2023.01) |
| ***G06N 3/048*** | (2023.01) |
| ***G06N 3/063*** | (2023.01) |
| ***G06N 3/08*** | (2023.01) |
| ***G06Q 10/067*** | (2023.01) |
| ***G06Q 50/163*** | (2024.01) |
| *F24F 120/10* | (2018.01) |
| *F24F 120/20* | (2018.01) |
| *F24F 140/50* | (2018.01) |
| *G06F 119/06* | (2020.01) |
| *G06F 119/08* | (2020.01) |

(56) References Cited

U.S. PATENT DOCUMENTS

| | | | | |
|---|---|---|---|---|
| 5,581,659 | A | 12/1996 | Takatori | |
| 5,748,847 | A | 5/1998 | Lo | |
| 6,119,125 | A | 9/2000 | Gloudeman et al. | |
| 6,967,565 | B2 | 11/2005 | Lingemann | |
| 7,447,664 | B2 | 11/2008 | Pado | |
| 9,020,647 | B2 | 4/2015 | Johnson et al. | |
| 9,258,201 | B2 | 2/2016 | McCoy et al. | |
| 9,298,197 | B2 | 3/2016 | Matsuoka et al. | |
| 9,557,750 | B2 | 1/2017 | Gust et al. | |
| 9,664,400 | B2 | 5/2017 | Wroblewski et al. | |
| 9,857,238 | B2 | 1/2018 | Malhotra et al. | |
| 10,013,644 | B2 | 7/2018 | Takahashi | |
| 10,094,586 | B2 | 10/2018 | Pavlovski et al. | |
| 10,140,544 | B1 | 11/2018 | Zhao et al. | |
| 10,845,815 | B2 | 11/2020 | Palanisamy et al. | |
| 2002/0152298 | A1 | 10/2002 | Kikta et al. | |
| 2008/0082183 | A1 | 4/2008 | Judge | |
| 2008/0222065 | A1 | 9/2008 | Kedrowski et al. | |
| 2008/0277486 | A1 | 11/2008 | Seem et al. | |
| 2010/0025483 | A1 | 2/2010 | Hoeynck et al. | |
| 2012/0016829 | A1* | 1/2012 | Snider | G06N 3/063 706/27 |
| 2014/0277757 | A1 | 9/2014 | Wang et al. | |
| 2015/0028278 | A1 | 1/2015 | Lee et al. | |
| 2016/0328432 | A1* | 11/2016 | Raghunathan | G06F 16/2264 |
| 2017/0091615 | A1* | 3/2017 | Liu | G06N 3/044 |
| 2017/0322579 | A1 | 11/2017 | Goparaju et al. | |
| 2018/0202678 | A1 | 7/2018 | Ahuja et al. | |
| 2018/0266716 | A1 | 9/2018 | Bender et al. | |
| 2018/0268286 | A1* | 9/2018 | Dasgupta | G06N 3/084 |
| 2018/0314937 | A1* | 11/2018 | Zarar | G06N 3/045 |
| 2018/0365558 | A1 | 12/2018 | Sekiyama et al. | |
| 2019/0130246 | A1 | 5/2019 | Katayama | |
| 2019/0360711 | A1 | 11/2019 | Sohn et al. | |
| 2020/0196973 | A1 | 6/2020 | Zhou et al. | |
| 2021/0182660 | A1 | 6/2021 | Amirguliyev et al. | |
| 2021/0397947 | A1 | 12/2021 | Li et al. | |
| 2023/0176840 | A1 | 6/2023 | Zhou et al. | |

OTHER PUBLICATIONS

Chao Huang et al., "ReachNN: Reachability Analysis of Neural-Network Controlled Systems", 2019, Association for Computing Machinery (Year: 2019).*

Dong, B., Lam, K.P. A real-time model predictive control for building heating and cooling systems based on the occupancy behavior pattern detection and local weather forecasting. Build. Simul. 7, 89-106 (2014). https://doi.org/10.1007/s12273-013-0142-7 (Year: 2014).*

Pedro Fazenda, Pedro Lima, & Paulo Carreira (2016). Context-based thermodynamic modeling of buildings spaces. Energy and Buildings, 124, 164-177. (Year: 2016).*

Edward Choi, Mohammad Taha Bahadori, Joshua A. Kulas, Andy Schuetz, Walter F. Stewart, & Jimeng Sun. (2017). Retain: An Interpretable Predictive Model for Healthcare using Reverse Time Attention Mechanism. (Year: 2017).*

Ma, F., Chitta, R., Zhou, J., You, Q., Sun, T., & Gao, J. (2017). Dipole: Diagnosis Prediction in Healthcare via Attention-based Bidirectional Recurrent Neural Networks. In Proceedings of the 23rd ACM SIGKDD International Conference on Knowledge Discovery and Data Mining (pp. 1903-1911). ACM. (Year: 2017).*

H. Zhao et al., "Learning based compact thermal modeling for energy-efficient smart building management," 2015 IEEE/ACM International Conference on Computer-Aided Design (ICCAD), Austin, TX, USA, 2015, pp. 450-456, doi: 10.1109/ICCAD.2015.7372604. (Year: 2015).*

Tanaya Chaudhuri, Yeng Chai Soh, Hua Li, & Lihua Xie (2019). A feedforward neural network based indoor-climate control framework for thermal comfort and energy saving in buildings. Applied Energy, 248, 44-53. (Year: 2019).*

An et al., "IC neuron: An efficient unit to construct neural netoworks". (Year:2020).

Medhi, et al., Jan. 2011, "Model-Based Hierarchical Optimal Control Design for HVAC Systems," ASME 2011 Dynamic Systems and Control Conference and Bath/ASME Symposium on Fluid Power and Motion Control.

Nakahara, "Study and Practice on HVAC System Commissioning," The 4th international Symposium on HVAC, Beijing, China, Oct. 9-11, 2003.

Nassif et al., "Self-tuning dynamic models of HVAC system components," 2008, Elsiever, Energy and Buildings 40, 1709-1720.

Rao, C++ Neural Networks and Fuzzy Logic, Jun. 1, 1995, MT Books, IDG Books Worldwide, Ind.

Rios, at al., "Derivative-free optimization: a review of algorithms and comparison of software implementations", J Glob Optimizers (2013) 56;1247-1293.

Sabor, et al., "Dynamic Routing Between Capsules," NIPS'17: Proceedings of the 31st International Conference on Neural Information Processing Systems, Dec. 2017, pp. 3859-3869.

Serale G., et al., Model Predictive Control (MPC) for Enhancing Building and HVAC System Energy Efficiency: Problem Formulation, Applications and Opportunities, Energies 2018, 11, 631; doi: 10.3390, Mar. 12, 2018.

Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net /1969 .1 /5060.

Veelenturf, L. P. J., Analysis and applications of artificial neural networks, 1995, Prentice Hall International (UK0) Ltd, United Kingdom.

Welsh, "Ongoing Commissioning (OCx) with BAS and Data Loggers," National Conference on Building Commissioning: Jun. 3-5, 2009.

Xiao et al., "Automatic Continuous Commissioning of Measurement Instruments in Air Handling Units," Building Commissioning for Energy Efficiency and Comfort, 2006, vol. VI-1-3, Shenzhen, China.

ANSI/ASHRAE Standard 55-2013: Thermal Environmental Conditions for Human Occupancy, ASHRAE, 2013.

De Dear, et al., "Developing an Adaptive Model of Thermal Comfort and Preference," ASHRAE Transactions 1998, vol. 104, Part 1.

Gagge, et. al., A Standard Predictive index of Human Response to the Thermal Environment, ASHRAE Transactions 1986, Part 2B.

Hatcher, John, "Smart Buildings get hyperaware", Smart Buildings Magazine, Aug. 24, 2020.

(56) References Cited

OTHER PUBLICATIONS

Mostafa et al., A Continuous-Time Recurrent Neural Network for Joint Equalization and Decoding—Analog Hardware Implementation Aspects, 2015, Ottawa University.
Nassif, Nabil, (2005), Optimization of HVAC control system strategy using two-objective genetic algorithm [microform].
Perra, et al., "Monitoring Indoor People Presence in Buildings Using Low-Cost Infrared Sensor Array in Doorways," Sensors (Basel). Jun. 2021; 21(12): 4062.
Qin et al., "Commissioning and Diagnosis of VAV Air-Conditioning Systems," Proceedings of the Sixth International Conference for Enhanced Building Operations, Shenzhen, China, Nov. 6-9, 2006.
Rabunal et al., Aritficial Neural Networks in Real-Life Applications, 2006, Idea Group Publishing, Hershey, PA.
Salsbury et al., "Automated Testing of HVAC Systems for Commissioning," Laurence Livermore National Laboratory, 1999, LBNL-43639.
Vanus et al., The design of an indirect method for the human presence monitoring in the intelligent building,Human-centric Computing and Information Sciences 8, Article No. 28 (2018).
An et al., "IC Neuron: An efficient unit to construct neural networks". (Year:2020).
Zhou U.S. Appl. No. 63/035,640 and Appendix (Year:2020).

* cited by examiner

400B

Choose Set of Time Series Data 410, 405B

Choose Time Series Data from k(index) to 0 410B

Choose Time Series Data from 0 to n 415B

Choose Time Series Data Skipping Values 420B

NEURAL NETWORK INITIALIZATION

RELATED APPLICATIONS

The present application hereby incorporates by reference the entirety of, and claims priority to, U.S. provisional patent application Ser. No. 62/704,976 filed Jun. 5, 2020.

The present application hereby incorporates by reference U.S. utility patent application Ser. No. 17/009,713, filed Sep. 1, 2020.

FIELD

The present disclosure relates to control of defined spaces using a virtual replica of the physically defined space. More specifically the present disclosure relates to initializing state of the virtual replica to more accurately match state of the physical defined space.

BACKGROUND

Artificial neural networks are powerful tools that have changed the nature of the world around us, leading to breakthroughs in classification problems, such as image and object recognition, voice generation and recognition, autonomous vehicle creation and new medical technologies, to name just a few. However, neural networks start from ground zero with no training. Training itself can be very onerous, both in that an appropriate training set must be assembled, and that the training often takes a very long time. For example, a neural network can be trained for human faces, but if the training set is not perfectly balanced between the many types of faces that exist, even after extensive training, it may still fail for a specific subset; at best, the answer is probabilistic; with the highest probability being considered the answer.

Existing approaches offer three steps to develop a deep learning AI model. The first step builds the structure of a neural network through defining the number of layers, number of neurons in each layer, and determines the activation function that will be used for the neural network. The second step determines what training data will work for the given problem, and locates such training data. The third step attempts to optimize the structure of the model, using the training data, through checking the difference between the output of the neural network and the desired output. The network then uses an iterative procedure to determine how to adjust the weights to more closely approach the desired output. Exploiting this methodology is cumbersome, at least because training the model is laborious.

Once the neural network is trained, it is basically a black box, composed of input, output, and hidden layers. The hidden layers are well and truly hidden, with no information that can be gleaned from them outside of the neural network itself. Thus, to answer a slightly different question, a new neural network, with a new training set must be developed, and all the computing power and time that is required to train a neural network must be employed.

SUMMARY

This summary is provided to introduce a selection of concepts in a simplified form that are further described below in the Detailed Description section. This summary does not identify required or essential features of the claimed subject matter.

In embodiments, a computer-implemented method for initializing a neural network with time series data from time t(n) to t0 is described, the heterogenous neural network having an input and neurons with variables, the method comprising: choosing a set of time series data, running the set of time series data from through at least one of the neurons in the heterogenous neural network; determining, at time t0, the value of the neuron variable; when, at time t0, the value of the neuron variable from the at least one of the neurons has reached the stopping state, considering the neural network initialized, and stopping; and repeating the choosing, running, determining, and determining steps.

In embodiments, the time series data is divided into x sections.

In embodiments, each section has k timesteps.

In embodiments, choosing a set of time series data comprises choosing time series data from tx(index) to t0, where index is initially set to t0.

In embodiments, when at time t0, a stopping state has not been reached, incrementing the index.

In embodiments, the neurons have activation functions, and wherein at least two activation functions comprise different equations.

In embodiments, the neuron has two variables, comprising a permanent state value and a transient state value.

In embodiments, the neuron variable has at least one output, and further comprising determining the output value by using the transient state value, the permanent state value, and the activation function.

In embodiments, at least one neuron variable is a transient state variable.

In embodiments, the time series data comprises state data.

In embodiments, the time series data is derived from a sensor in a structure the neural network is emulating.

In embodiments, the stopping state comprises the neuron variable value reaching a threshold value, the index value being greater than x, or reaching a neural network running time limit.

A system for initializing a neural network is disclosed, comprising: a processor; a memory in operational communication with the processor; a neural network which resides at least partially in the memory, the neural network comprising neurons with activation functions and variables, the variables calculated as part of the activation functions; an input time series that is at least partially used as input to the neural network; a neural network initializer which resides at least partially in memory, the neural network initializer comprising: a feedforwarder that feeds at least a part of the input time series forward through the neural network; a state determiner that determines a state of the neuron; an input determiner that determines when a stopping state is reached, determining the neural network initialized, when the stopping state has not been reached determining a portion of the input time series to run as input into the neural network.

In embodiments, the variable comprises a transient state variable or a permanent state variable.

In embodiments, the input determiner determines if the value of a transient variable is at a threshold.

In embodiments, the stopping state comprises the neuron variable value reaching a threshold value, the index value being greater than x, or reaching a neural network running time limit.

In embodiments, the neuron represents a building portion or a resource portion.

A computer-readable storage medium configured with data and instructions is disclosed, which upon execution by a processor perform a method for initializing a neural network with time series data from time t(n) to t0, the heterogenous neural network having an input and neurons with variables, the method comprising: choosing a set of time series data, running the set of time series data from through at least one of the neurons in the heterogenous neural network; determining, at time 0, the value of the neuron variable; when, at time 0, the value of the neuron variable from the at least one of the neurons has reached the stopping state, considering the neural network initialized, and stopping; and repeating the choosing, running, determining, and determining steps.

In embodiments, the time series data is divided into x sections, each section has k timesteps, choosing a set of time series data comprises choosing time series data from tx(index) to t0, where index is initially set to t0, and wherein when at time t0, a stopping state has not been reached, incrementing the index.

These, and other, aspects of the invention will be better appreciated and understood when considered in conjunction with the following description and the accompanying drawings. The following description, while indicating various embodiments of the embodiments and numerous specific details thereof, is given by way of illustration and not of limitation. Many substitutions, modifications, additions or rearrangements may be made within the scope of the embodiments, and the embodiments includes all such substitutions, modifications, additions or rearrangements.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
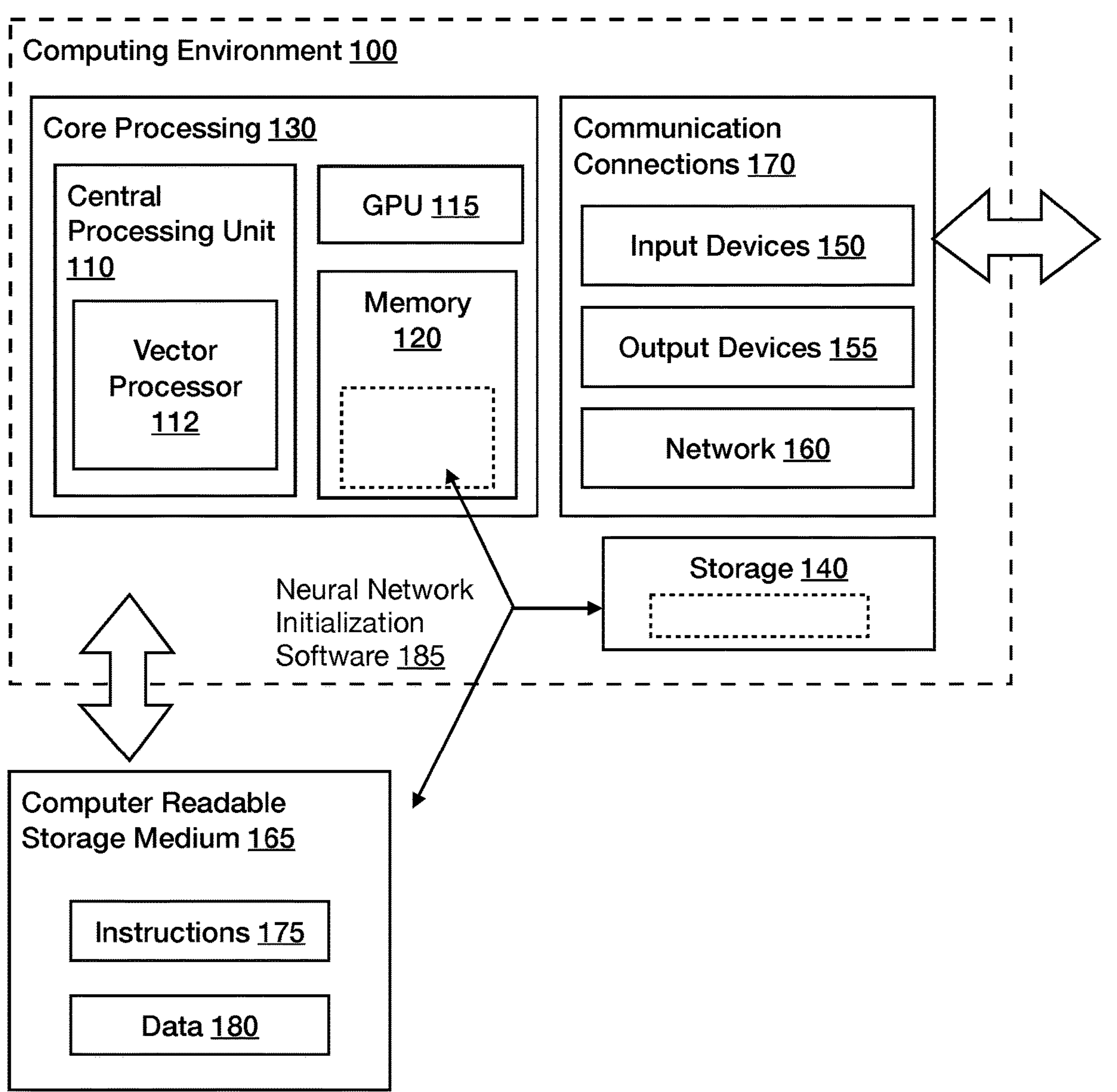
FIG. 1 depicts a computing system in in accordance with one or more embodiments.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to heterogenous neural networks.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects. Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

Embodiments may be implemented in edge computing environments where the computing is done within a network which, in some implementations, may not be connected to an outside internet, although the edge computing environment may be connected with an internal internet. This internet may be wired, wireless, or a combination of both. Embodiments may also be implemented in cloud computing environments. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by general or special purpose hardware-based systems that perform the specified functions or acts, or combinations of general and special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

I. Overview

A neural network representing a controlled space can be initialized by collecting state time series data that affects the controlled space such as weather, and also collecting sensor data at the same time. The time series data is used as input to a "cold", i.e., uninitialized, neural network that models the controlled space until an area in the neural network equivalent to the sensor is at or near the sensor state. The initialized neural network can then be used to model the controlled space with the internal values already within the neural network at reasonable states. For example, an uninitialized neural network may have the internal values all set to 0 (or some other initialization value), which would be the equivalent of a structure at the temperature 0, for example. When initialized, the air equivalent in the controlled space model may be at 72°, long with the other modeled structures. The neural network can then be used to determine controlled space behavior, such as optimal control states for equipment (on, off, running at some intermediate value). This can save up to 30% of the energy in a building. By warming up a neural network first, the neural network can be run using much less computer cycles to achieve the same results, saving computer time and memory space, among other savings. Technical effects provided by some embodiments include more efficient use of computer resources, with less need for computing power in low-latency in-house networks. Some technical activities described herein support software programs that can run without cloud or external network support. The thermodynamic model may be warmed up prior to iteratively running the, to establish a starting state. This simulation may be pre-run until a starting state is reached. That starting state may be some internal values of the model (such as heat) being within a margin of error of a historical series of time series state values. If the pre-run set of time values does not achieve the internal values being within the margin of error, successively longer time value series may be run until the internal values are within the margin of error. This allows the neural network to have reasonable inner values when beginning running a model. For example, if a neural network of a building is run with inner heat values at 0 overall, it will give a very different answer or take a much longer time to reach the correct answer than if the neural network has state values that come close to or match values in the space that is being modeled when run. Initializing the neural network therefore allows for much quicker running of complex models.

II. Exemplary Computing Environment

FIG. 1 illustrates a generalized example of a suitable computing environment 100 in which described embodiments may be implemented. The computing environment 100 is not intended to suggest any limitation as to scope of use or functionality of the disclosure, as the present disclosure may be implemented in diverse general-purpose or special-purpose computing environments.

With reference to FIG. 1, the core processing is indicated by the core processing 130 box. The computing environment 100 includes at least one central processing unit 110 and memory 120. The central processing unit 110 executes computer-executable instructions and may be a real or a virtual processor. It may also comprise a vector processor 112, which allows same-length neuron strings to be processed rapidly. In a multi-processing system, multiple processing units execute computer-executable instructions to increase processing power and as such the vector processor 112, GPU 115, and CPU can be running simultaneously. The memory 120 may be volatile memory (e.g., registers, cache, RAM), non-volatile memory (e.g., ROM, EEPROM, flash memory, etc.), or some combination of the two. The memory 120 stores software 185 implementing the described methods and systems of initializing neural networks.

A computing environment may have additional features. For example, the computing environment 100 includes storage 140, one or more input devices 150, one or more output devices 155, one or more network connections (e.g., wired, wireless, etc.) 160 as well as other communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100. The computing system may also be distributed; running portions of the software 185 on different CPUs.

The storage 140 may be removable or non-removable, and includes magnetic disks, magnetic tapes or cassettes, CD-ROMs, CD-RWs, DVDs, flash drives, or any other medium which can be used to store information and which can be accessed within the computing environment 100. The storage 140 stores instructions for the software, such as software 185 to implement methods of neural network initialization.

The input device(s) 150 may be a device that allows a user or another device to communicate with the computing environment 100, such as a touch input device such as a keyboard, video camera, a microphone, mouse, pen, or trackball, and a scanning device, touchscreen, or another device that provides input to the computing environment 100. For audio, the input device(s) 150 may be a sound card or similar device that accepts audio input in analog or digital form, or a CD-ROM reader that provides audio samples to the computing environment. The output device(s) 155 may be a display, printer, speaker, CD-writer, or another device that provides output from the computing environment 100.

The communication connection(s) 170 enable communication over a communication medium to another computing entity. The communication medium conveys information such as computer-executable instructions, compressed graphics information, or other data in a modulated data signal. Communication connections 170 may comprise input devices 150, output devices 155, and input/output devices that allows a client device to communicate with another device over network 160. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 160 may be a combination of multiple different kinds of wired or wireless networks. The network 160 may be a distributed network, with multiple computers, which might be building controllers, acting in tandem. A computing connection 170 may be a portable communications device such as a wireless handheld device, a cell phone device, and so on.

Computer-readable media are any available non-transient tangible media that can be accessed within a computing environment. By way of example, and not limitation, with the computing environment 100, computer-readable media include memory 120, storage 140, communication media, and combinations of any of the above. Computer readable storage media 165 which may be used to store computer readable media comprises instructions 175 and data 180. Data Sources may be computing devices, such as general hardware platform servers configured to receive and transmit information over the communications connections 170. The computing environment 100 may be an electrical controller that is directly connected to various resources, such as HVAC resources, and which has CPU 110, a GPU 115, Memory, 120, input devices 150, communication connections 170, and/or other features shown in the computing environment 100. The computing environment 100 may be a series of distributed computers. These distributed computers may comprise a series of connected electrical controllers.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

Figure 2:
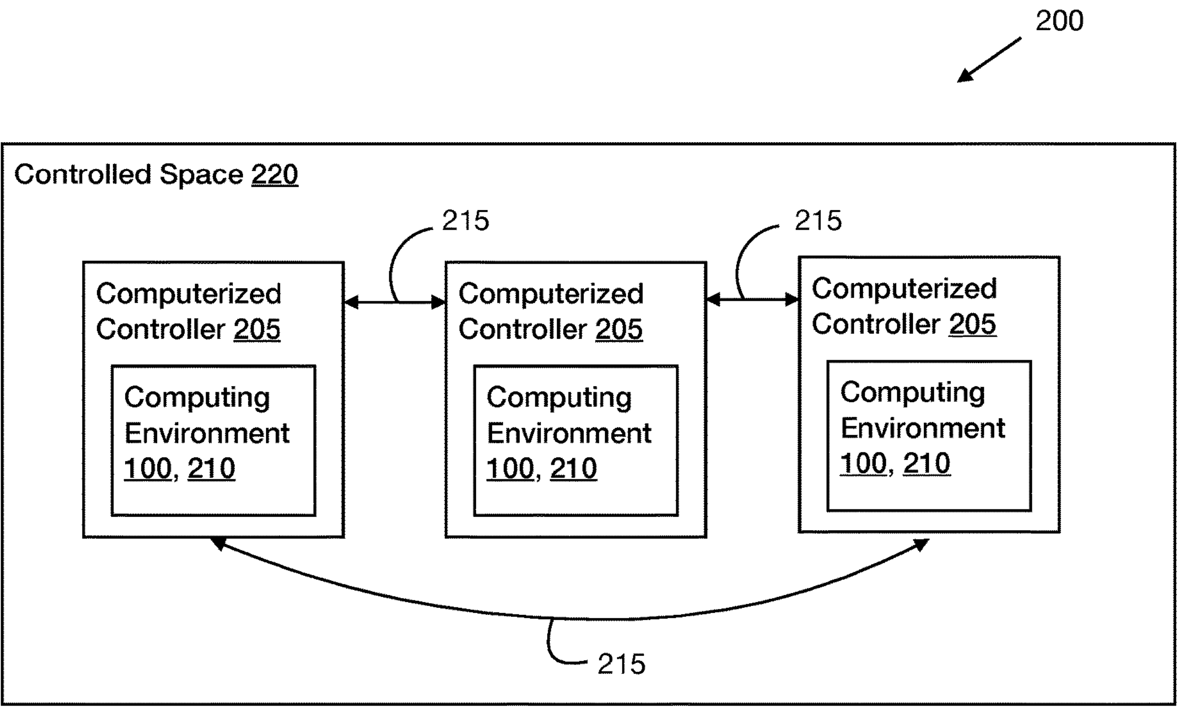
FIG. 2 depicts a distributed computing system in accordance with one or more embodiments.

FIG. 2 depicts a distributed computing system 200 with which embodiments disclosed herein may be implemented. Two or more computerized controllers 205 may incorporate all or part of a computing environment 100, 210. These computerized controllers 205 may be connected 215 to each other using wired or wireless connections. The controllers may be within a controlled space 220. A controlled space 220 may be a space that has a resource, sensor, or other equipment that can modify or determine one or more states state of the space, such as a sensor (to determine space state), a heater, an air conditioner (to modify temperature); a speaker (to modify noise), locks, lights, etc. A controlled space may be divided into zones, which might have separate constraint state curves. Controlled spaces might be, e.g., an automated building, a process control system, an HVAC system, an energy system, an irrigation system, a building-irrigation system, etc. These computerized controllers 205 may comprise a distributed system that can run without using connections (such as interne connections) outside of the computing system 200 itself. This allows the system to run with low latency, and with other benefits of edge computing systems.

III. Exemplary System Embodiments

Figure 3:
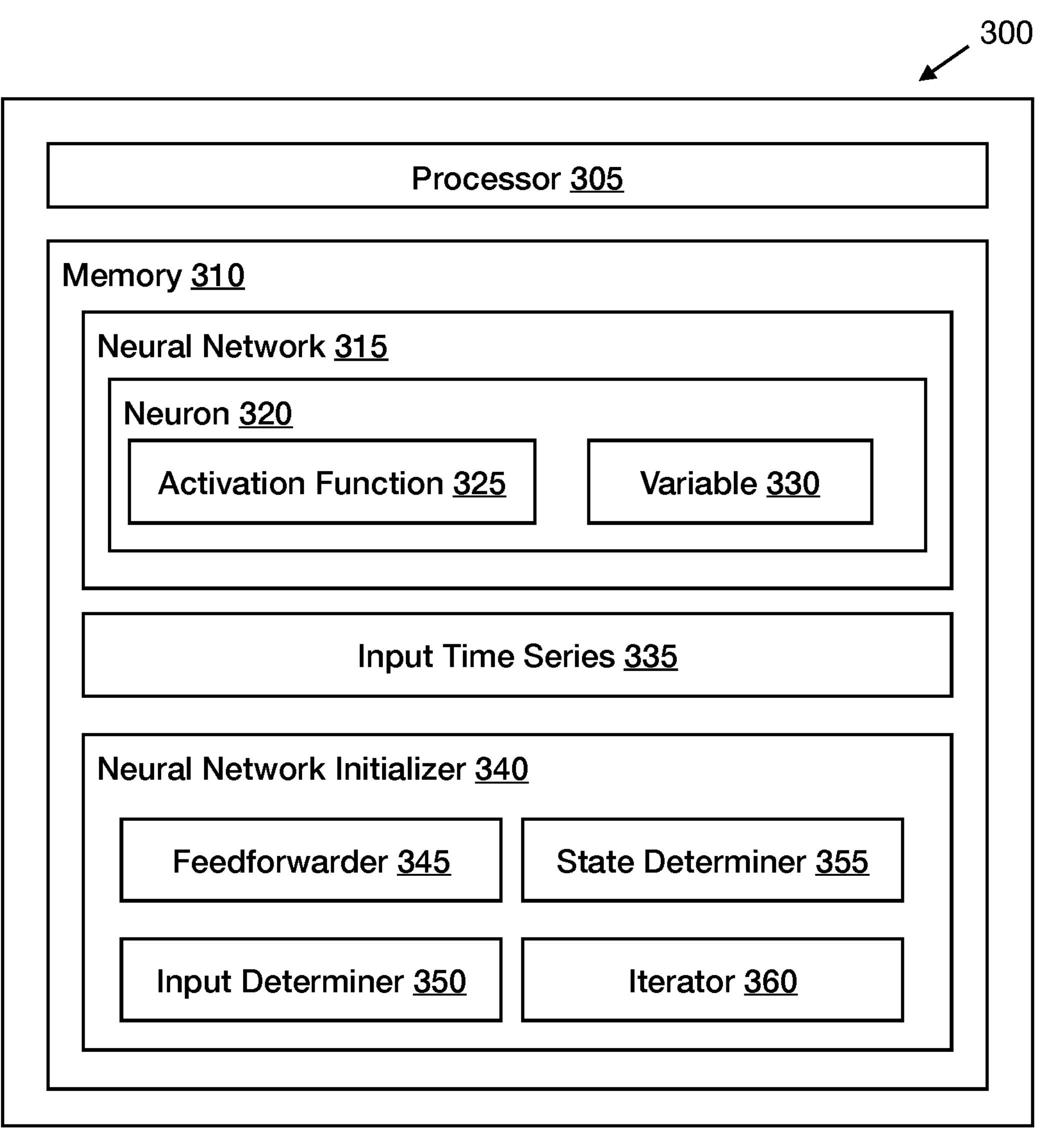
FIG. 3 depicts a system configured to initialize neural networks in accordance with one or more embodiments.

FIG. 3 depicts an exemplary system 300 for initializing neural networks. The system may include at least one processor 305, which may comprise a computing environment 100, and/or may be part of a computerized controller system 200. Memory 310 may also be part of a computing environment 100 and/or may be part of a computerized controller system 200. The memory 310 may comprise a neural network 315. In some embodiments, the neural network may reside partially in memory. In some embodiments, the neural network may thermodynamically model a controlled space, e.g., 220. This neural network may thermodynamically represent the controlled space in some way. It may represent the controlled space 220 as a single space, or may break the controlled space up into different zones, which thermodynamically effect each other. The neural network 315 may comprise neurons 320 that represent individual material layers of a physical space and how they change state, e.g., their resistance, capacitance, and/or other values that describe how state flows though the section of the controlled space 220 that is being modeled. In some neural networks 315, neurons 320 (which may represent material layers) are formed into parallel and branchless neural network strings that propagate heat (and/or other state values) through them. In some embodiments, other neural structures are used. In some embodiments, structure models other than neural networks are used. More information on neural networks can be found with reference to FIG. 8 and the surrounding text.

The neural network 315 my comprise one or more neurons 320. A neuron may comprise one or more activation functions 325 and one or more variables 330. The activation function may use a variable value to calculate other internal variable values within the neuron, and/or values output by the neuron. One or more variables 330 of a neuron 320 may be calculated as a part of an activation function associated with the neuron. An activation function may comprise one or more equations which represent a physics representation of an object which the associated neuron represents. Neurons are described with more particularity with reference to FIG. 6 and the associated text.

The system 300 may also comprise an input time series 335. The input time series 335 may be stored in memory 310. The input time series 335 may comprise a time series of state that affects a controlled space over time, such as Temperature, Radiant Temperature, Atmospheric Pressure, Sound Pressure, Occupancy Amount, Occupancy Distance, Indoor Air Quality, CO2 Concentration, Light Intensity, or another state that can be measured and controlled. For example, the input time series 335 may indicate the temperature over a period of time that affects a controlled space 220 associated with a neural network 315. This input time series 335 may at least partially or wholly be used as input to the neural network. Some neural networks may accept multiple input time series 335 as inputs.

A neural network initializer 340—which may reside at least partially in memory, and which may comprise one or more computer programs that may run on a core processing unit 130, and/or as part of distributed computing system 200—may be used to initialize the neural network 315. The neural network initializer 340 may use an Feedforwarder 345 to update inputs throughout the neural network 315. The Feedforwarder 345 may feed at least a part of the input time series 335 forward through the neural network. The neural network initializer 340 may also comprise a state determiner 355 that determines a state of the neuron. A neuron may have a variable that represents temperature of the neuron; the state determiner may be able to look at the variable that represents temperature and determine variable value.

Figure 5:
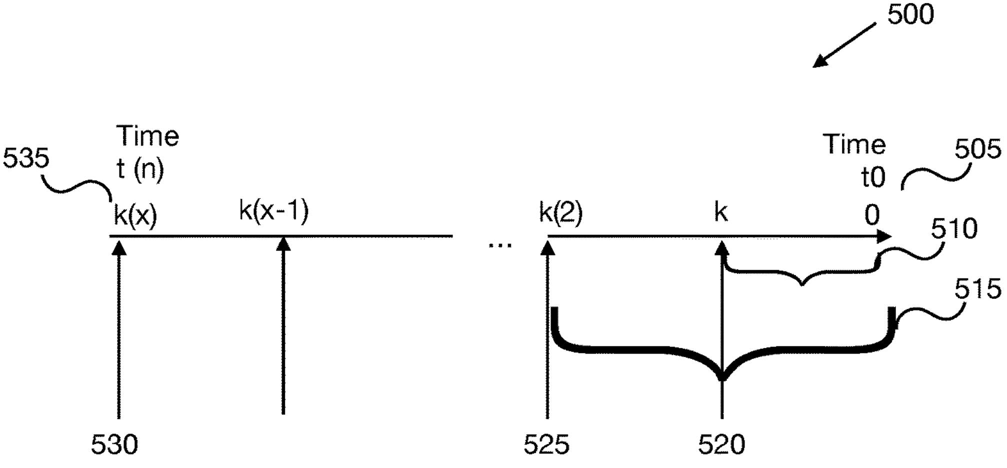
FIG. 5 depicts an input time series in accordance with one or more embodiments.

An input determiner 350 may be used to determine when a stopping state is reached. The stopping state may be that the program has run for a given time, that the neural network 315 has run for a given number of iterations, that a value has been reached, etc. A threshold value may be derived from a value of a sensor in a controlled space that the neural network is modeling. A threshold may be reached when a state variable within a neuron reaches a certain value, is over a certain value, is under a certain value, etc, is within a range of a given value, etc. For example, a threshold of 68 F may be set as the stopping state. A specific neuron variable 330 within the neural network 315 representing temperature may be within half a degree of the programatic equivalent of 68 F, indicating that a stopping state has been reached. In such a case, the neural network may be considered initialized, with the current values of the neuron variables 330. When the stopping state has not been reached, then a portion of the input time series is determined to run as input into the neural network. FIG. 5 and the surrounding text discusses a way to determine what portion of the input time series 335 to use for the feedforwarder 345 to run the neural network 315. An iterator 360 runs the input time series 335 through the Feedforwarder 345, runs the state determiner 355 to determine if a neuron variable is at a desired state, and runs the input determiner to determine the next input time series 335 for the neural network until a stopping state is reached. Once a stopping state is reached, the neural network may be considered initialized, or may not, if the model stopped because a running time threshold was reached, because insufficient time series data was present, or if another error state caused the model to stop.

IV. Exemplary Method Embodiments

Figure 4A:
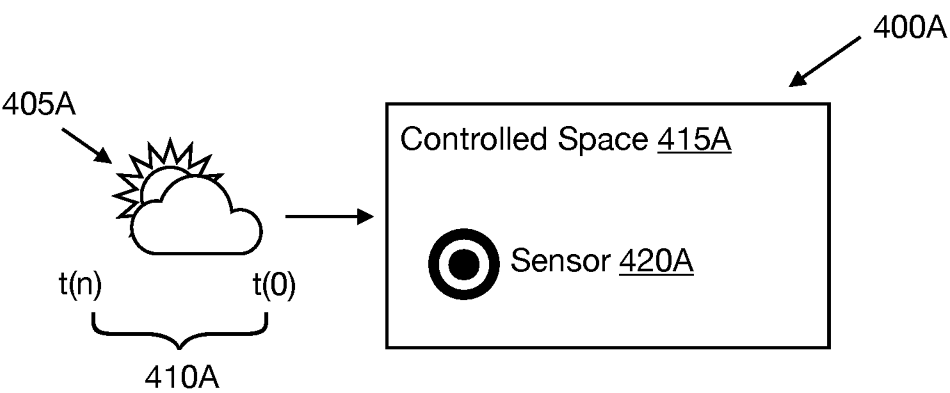
FIG. 4A depicts determining an input time series in accordance with one or more embodiments.
Figures 4, 4B:
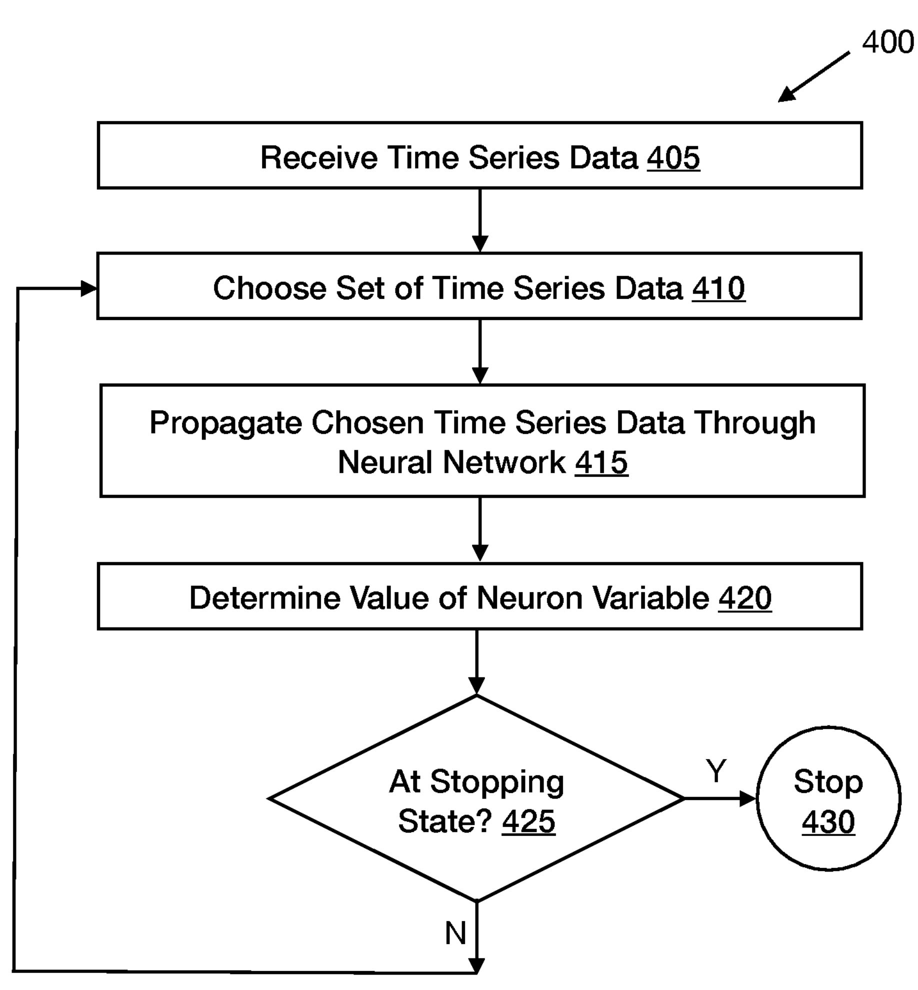
FIG. 4 depicts a method configured to initialize neural networks in accordance with one or more embodiments.
FIG. 4B depicts determining a set of time series data in accordance with one or more embodiments.

FIG. 4 depicts a method configured to initialize neural networks in accordance with one or more embodiments. The operations of method 400 and other methods presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting. In some embodiments, method 400 may be implemented in one or more processing devices (e.g., a distributed system, a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 405, input time series data is received. FIG. 4A at 400B depicts an exemplary way of determining an input time series. As an overview, neural network 315 may represent some controlled space 415A. This controlled space 415A may have a sensor 420A that records state of the space 415A. State that affects the space 405A, such as weather, may be gathered 410A (e.g., from t(n) to t(0)) during the same time that data is being collected from a sensor 420*a*. This state data may be applied to the neural network representing the controlled space to initialize the neural network. When a variable in the neural network representing the controlled space 415A with the sensor 420A matches the sensor data at t(0), the neural network may be considered to be initialized.

FIG. 4B at 400B depicts exemplary ways of determining a set of time series data. FIG. 5 at 500 exemplary time series data is shown, with the timesteps running from t(n) 535 to t(0) 505. At operation 410, 405B a set of the time series data is chosen. At operation 410B a set of time series data is chosen from k(index) to 0. The time series data may be divided into x sections, each section with some number of timesteps. In some embodiments, each section may have the same number, e.g., k, timesteps 510. In some embodiments, the data runs from a value within the time series to the last value taken, t(0) 505. In some embodiments, the data may have a different ending point, or in a different direction. The first time a neural network is run, the time series data may be run from k 520 to 0 510. If a stopping state is not reached, the second time the neural network is run, it my be run from k(2) 525 to 0 515, up to k(x) 530. In some embodiments, there may be a variable number of timesteps per section. In some embodiments, or in some choosing operations 405B the time series data is chosen in some set from 0 to n 415B. In some embodiments, the time series data may be chosen by skipping timesteps in the time series data; 420B; for example, every second value may be chosen, etc.

At operation 415, the chosen time series data is propagated through the neural network 315. This may be done using a feedforwarder 345 or through a different method. At operation 420, the value of a neuron variable may be determined. At operation 425, it is determined if a stopping state has been reached. The stopping state may comprise the neuron variable value reaching a threshold value or similar, an index value being greater than x, reaching the limit of the time series data, reaching a neural network running time limit, or reaching an error state.

If the stopping state has been reached, in some embodiments, the program stops 430, and the neural network may be considered initialized. If the stopping state has not been reached, then another set of time series data may be chosen, and the process continues.

Figure 6:
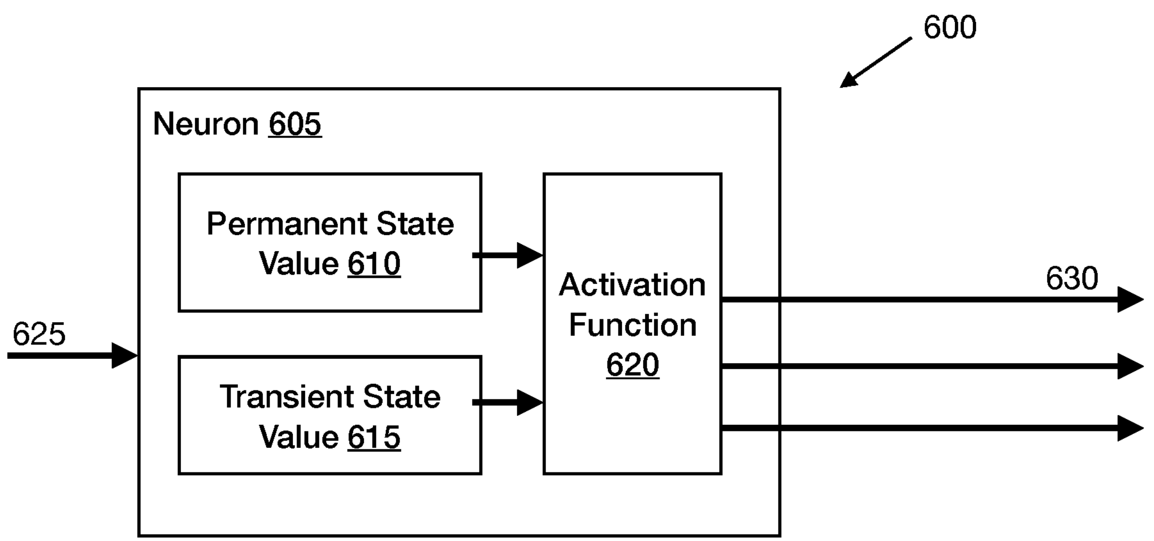
FIG. 6 depicts an exemplary neuron in accordance with one or more embodiments.

FIG. 6 depicts a neuron and inputs and outputs 600 that may be used in certain embodiments. Neural networks described herein may not have traditional input and output layers. Rather, neurons may have internal values that can be captured as output. A neuron 605 may have an activation function 625 that is comprised of one or more equations. These equations may model state moving through the space or used equations in a different manner. The neuron itself may have permanent state values 610 associated with the equations, e.g., Layer Mass, Layer Heat Capacity, and Heat Transfer Rate, to name a few that may be used to model controlled spaces. These may describe physical properties of building materials that will not change during a model run. The neuron may also have transient state values 615 that flow through the neural network, as inputs, and/or outputs, 630 that may be changed by the neuron's activation function 620 interacting with the transient state values 615 and/or permanent state values 610. These transient state values may be qualities such as Temperature, Mass Flow Rate, Pressure, etc. As the a neural network is run, the different timesteps may alter the transient state values in the neuron.

Figure 7:
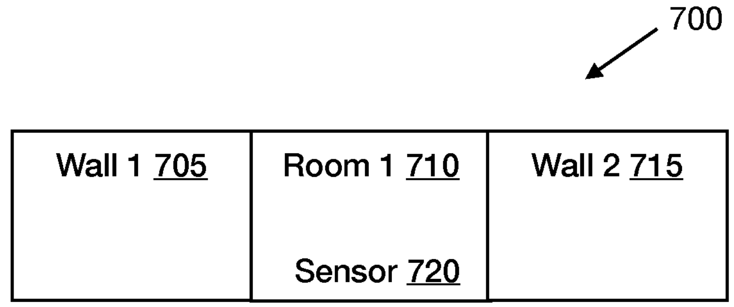
FIG. 7 depicts an exemplary controlled space in accordance with one or more embodiments.

FIG. 7 depicts an exemplary simplified controlled space 700 which can be modeled using a neural network. The controlled space 700 comprises a Wall 1 705 connected to Room 1 710 with a sensor 720 that can record state in Room 1 710. Wall 2 715 is connected to Room 1.

Figure 8:
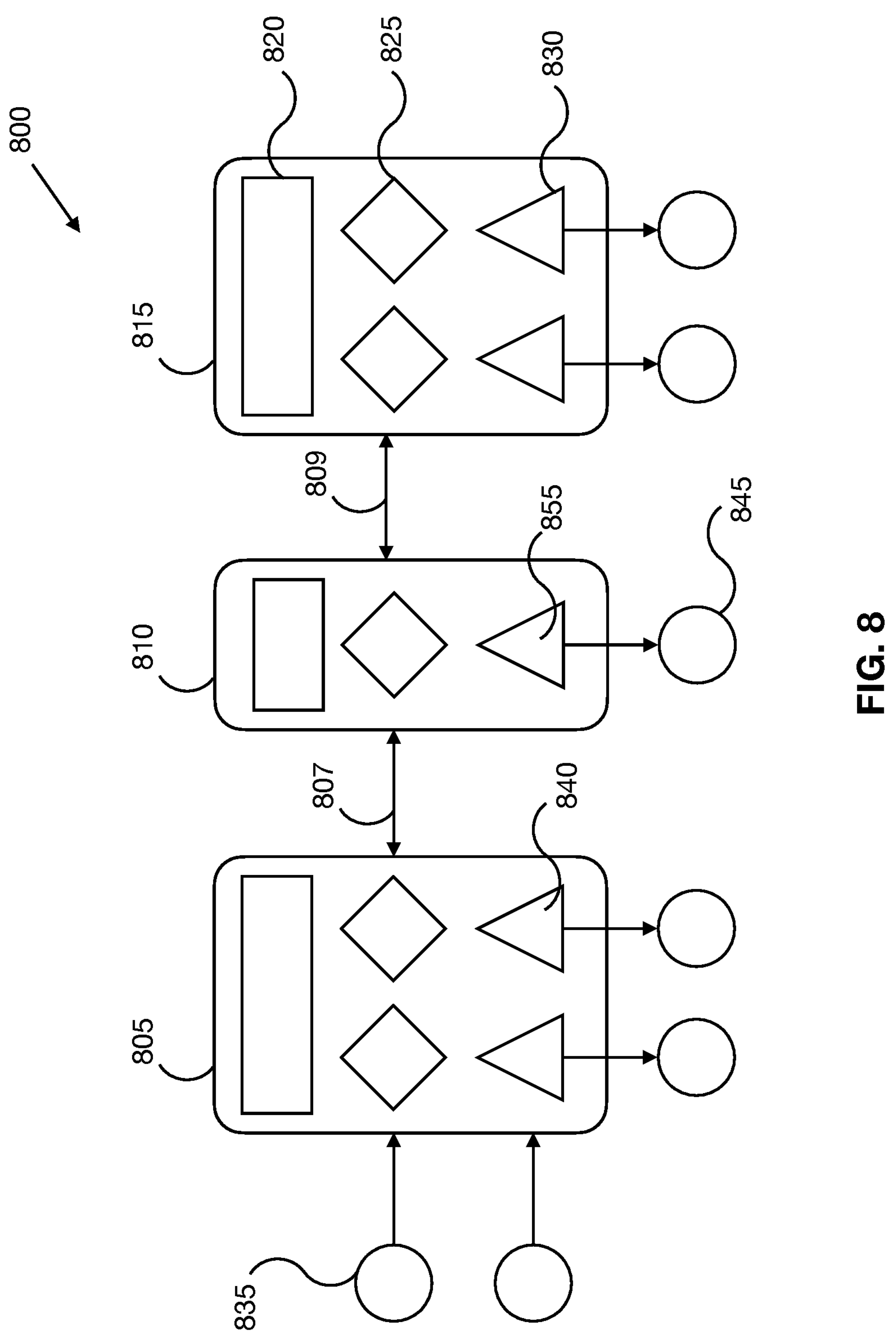
FIG. 8 depicts an exemplary neural network to model the space shown in FIG. 7 in accordance with one or more embodiments.

FIG. 8 depicts an exemplary neural network 800 that can be used to model the controlled space 700. In embodiments, neurons 805, 810, 815 are arraigned spatially similarly to the structure/objects being modeled. In the instant example, Wall 1 705 is modeled by neuron 805, Wall 2 is modeled by neuron 815, and Room 1 is modeled by neuron 810, which is connected 807 to neuron 805 (Wall 1 equivalent) and also connected 809 to neuron 815 (Wall 2 equivalent). The neurons comprise activation functions (rectangle) 820, permanent state values 825 (diamonds), and transient state values (pyramids) 830. The transient state values may be modified and passed from neuron to neuron. Time series data may be input 835, and then used by the activation functions 820 to calculate the transient state values throughout the neural network. The controlled space 700 has a sensor 720 that records state values. The neuron variable values 825, 830, 840, 855 (transient state values and/or permanent state values) may be determined during the feedforward run, at the end of a feed forward run, somewhere in the middle, etc.

The variable value 855 may be a state value that is equivalent to the sensor 720, as it is in the neuron 810 that represents Room 1 710. Accessing the output 845 may be a way to determine the value 855. Initializing the neural network 800 may comprise using time series data that comprises state affecting the controlled space 700 over time, such as temperature. The controlled space records the temperature of room 1 710 using the sensor 720. When the transient state variable 855 reaches a value similar to that of the sensor 720, the neural network may be considered warmed up. The activation functions 820 in the different neurons may be different, themselves. For example, a wall activation function may comprise a set of equations that model state changes within a wall, while the room activation function may comprise a set of equations that model state changes within a room. Different materials may be represented by neurons with different activation functions that model those materials. Such networks with different activation functions may be called heterogenous neural networks.

Figure 9:
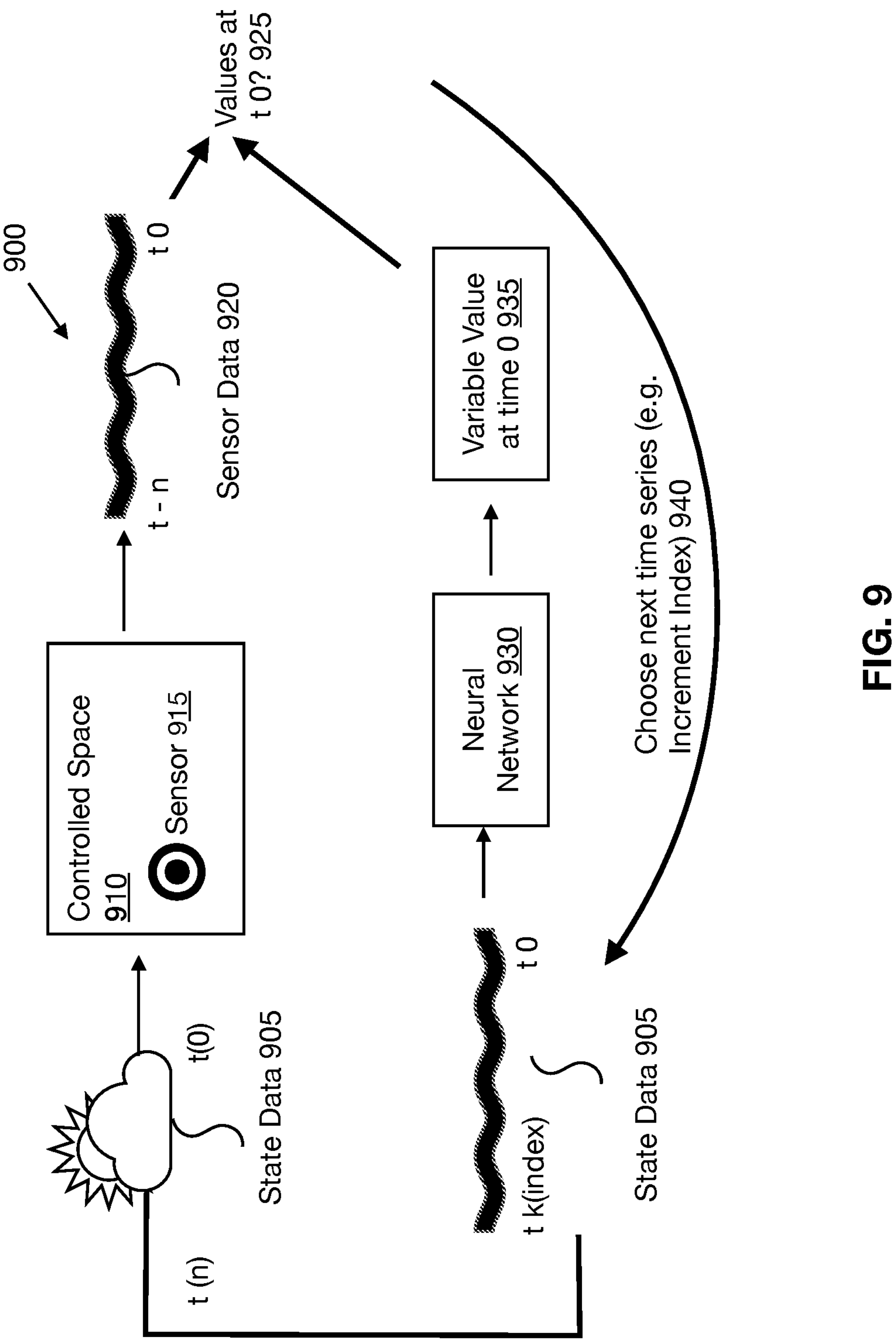
FIG. 9 depicts a flow diagram to initialize neural networks in accordance with one or more embodiments.

FIG. 9 depicts a flow diagram 900 that may describe an exemplary way to initialize neural networks. State data 905 (which may be weather data)—as it affects a controlled space 910—is gathered for some period of time, here from t(n) to t(0). A sensor 915 within the controlled space also gathers data about the state of the space 920. A portion of the state data 905, is used as input into a neural network 930 that thermodynamically maps the controlled space 910. After the neural network is run using the data, a variable value at time 0 935 (the end of the run) is checked against the sensor data value at time 0 925. If the values are not close enough, then a different section of the state data is chosen for the next run 940. This may be a larger section of the data, still ending at time 0. One way to do this is to divide the data into x sections, each section having k timesteps. The data run would then be k (index) to 0, with the index being incremented decremented with each run. In some embodiments, shorter data runs may be used, in which case the first dataset run may be k(x) to 0, with the index being decremented with each run. In some embodiments, a simulated controlled space may be used, with simulated state data 905, sensor data 915, etc.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method for initializing and operating a thermodynamic neural network representing a building, the method comprising:

receiving, from at least one physical sensor located within the building, sensor values representing a state of a portion of the building;

receiving a sequence of time state values;

storing the sequence of time state values in a memory;

receiving a sensor value of the portion of the building;

storing the sensor value in the memory;

executing, by a processor, a neural network stored in the memory, the neural network comprising a first neuron and a second neuron, the first neuron representing a first structural component of the building and the second neuron representing a second structural component thermally coupled to the first structural component, each neuron comprising an activation function, the activation function comprising a permanent variable representing a physical property of a building structure, and a transient variable representing a thermodynamic state of the building;

propagating the sequence of time state values through the neural network over the sequence of time state values;

computing, by the activation function of the first neuron, a value of the transient variable of the first neuron using at least one of the sequence of time state values;

computing, by the activation function of the second neuron, a value of the transient variable of the second neuron using output from the first neuron;

iteratively updating the transient variable of the second neuron for successive time values until the transient variable corresponds to the sensor value;

after the transient variable corresponds to the sensor value, generating a thermodynamic state model of the portion of the building; and determining an operating state of a heating or cooling system of the building based on the thermodynamic state model.

2. The method of claim 1, further comprising causing operation of a heating or cooling system of the building based on the thermodynamic state.

3. The method of claim 1, wherein the permanent variable represents a physical property of a building structure, and a transient variable represents a thermodynamic state.

4. The method of claim 1, wherein the permanent variable represents a physical property comprising heat capacity, thermal resistance, or heat transfer rate.

5. The method of claim 4, wherein the first structural component comprises a wall and the second structural component comprises a room.

6. The method of claim 1, wherein the transient variable represents temperature within the portion of the building.

7. The method of claim 1, further comprising determining an operating state for a heating system using the transient variable of the second neuron.

8. The method of claim 7, further comprising determining an operating state for a heating system using the heating requirement.

9. The method of claim 1, wherein activation functions in different neurons represent different sets of equations.

10. The method of claim 9, wherein the activation functions in different neurons model different materials.

11. A system for modeling thermodynamic behavior of a building, comprising:

a processor;

a memory in operational communication with the processor; and a neural network stored in the memory, the neural network comprising a plurality of neurons including a first neuron and a second neuron, the first neuron representing a first structural component of the building and the second neuron representing a second structural component thermally coupled to the first structural component, each neuron comprising an activation function, the activation function comprising a permanent variable representing a physical property of a building structure, and a transient variable representing a thermodynamic state;

wherein the processor is in communication with the memory configured to:

receive a value comprising a sensed state of the building;

receive values representing state;

propagate the values representing state through the neural network, comprising computing transient variable values of the neurons using the activation functions;

after the transient variable corresponds to the sensed state, operating the neural network to determine a thermodynamic state of a portion of the building;

determine a thermodynamic state of the portion of the building using the transient variable of the second neuron; and determine an operating state of a heating or cooling system of the building based on the thermodynamic state.

12. The system of claim 11, wherein the thermodynamic state comprises temperature of the portion of the building.

13. The system of claim 11, wherein the control signal controls operation of a heating system or cooling system.

14. The system of claim 11, wherein the first neuron and the second neuron are arranged in the neural network to correspond spatially to structural components of the building.

15. The system of claim 11, wherein the neural network models thermodynamic heat transfer between rooms and walls of the building.

16. A non-transitory computer-readable storage medium storing instructions which, when executed by a processor, cause the processor to:

execute, by the processor, a neural network stored in memory, the neural network comprising a first neuron and a second neuron, the first neuron representing a first structural component of the building and the second neuron representing a second structural component thermally coupled to the first structural component, each neuron comprising an activation function, the activation function comprising a permanent variable representing a physical property of a building structure, and a transient variable representing a thermodynamic state of a building;

receive a value comprising a sensed state of a building;

receive values representing state;

propagate the values representing state through a neural network, comprising computing transient variable values of the neurons using the activation functions;

after the transient variable corresponds to the sensed state, operating the neural network to determine a thermodynamic state of a portion of the building;

determine a thermodynamic state of the portion of the building using the transient variable of the second neuron; and determine an operating state of a heating or cooling system of the building based on the thermodynamic state.

17. The non-transitory computer-readable storage medium of claim 16, wherein the first neuron and the second neuron are arranged in the neural network to correspond spatially to structural components of the building.

18. The non-transitory computer-readable storage medium of claim 16, wherein a transient state value of at least one neuron is captured as output.

19. The non-transitory computer-readable storage medium of claim 16, wherein the activation functions in different neurons represent different sets of equations.

20. The non-transitory computer-readable storage medium of claim 19, wherein the activation functions in different neurons model different materials.

21. The non-transitory computer-readable storage medium of claim 16, wherein the neurons further comprise permanent state values, and wherein the permanent state values model physical features of an object represented by the neuron.

* * * * *